United States Patent
Bangs et al.

(10) Patent No.: US 8,489,020 B2
(45) Date of Patent: Jul. 16, 2013

(54) NFC COMMUNICATORS IMPLEMENTING COIL VOLTAGE REDUCTION CIRCUITRY

(75) Inventors: Joakim Bangs, Gloucestershire (GB); Robin Wilson, Gloucestershire (GB); Franz Fuchs, Gloucestershire (GB)

(73) Assignee: Broadcom Innovision Limited, Cambridge, Cambridgeshire (GB)

( * ) Notice: Subject to any disclaimer, the term of this patent is extended or adjusted under 35 U.S.C. 154(b) by 825 days.

(21) Appl. No.: 12/532,737

(22) PCT Filed: Mar. 20, 2008

(86) PCT No.: PCT/GB2008/000992
§ 371 (c)(1), (2), (4) Date: Dec. 28, 2009

(87) PCT Pub. No.: WO2008/117029
PCT Pub. Date: Oct. 2, 2008

(65) Prior Publication Data
US 2010/0112941 A1    May 6, 2010

(30) Foreign Application Priority Data
Mar. 23, 2007  (GB) .................................. 0705635.1

(51) Int. Cl.
*H04B 5/00*    (2006.01)
*H01Q 21/00*   (2006.01)

(52) U.S. Cl.
USPC ......................................... 455/41.1; 343/867

(58) Field of Classification Search
None
See application file for complete search history.

(56) References Cited

U.S. PATENT DOCUMENTS

| | | | | |
|---|---|---|---|---|
| 5,241,160 | A | * | 8/1993 | Bashan et al. ................. 235/380 |
| 2004/0134985 | A1 | * | 7/2004 | Deguchi et al. ................ 235/451 |
| 2008/0064346 | A1 | * | 3/2008 | Charrat ......................... 455/131 |
| 2008/0245851 | A1 | * | 10/2008 | Kowalski ....................... 235/375 |

FOREIGN PATENT DOCUMENTS
WO    WO-2006095186 A1    9/2006

OTHER PUBLICATIONS

"Application Ser. No. PCT/GB2008/000992, International Search Report and Written Opinion", (Sep. 19, 2008), 11 pgs.

\* cited by examiner

*Primary Examiner* — Yuwen Pan
*Assistant Examiner* — Ayodeji Ayotunde
(74) *Attorney, Agent, or Firm* — Sterne, Kessler, Goldstein & Fox PLLC

(57) ABSTRACT

An NFC communicator has an antenna circuit to enable inductive coupling, via an RF H field, of the NFC communicator and another near field RF communicator in near field range. The antenna circuit has an antenna element coupled in parallel with a first capacitor to form a parallel LC circuit. The antenna element has an antenna coil in series with a second capacitor to reduce the voltage to which circuitry of the NFC communicator is subjected by a received RF H field. Alternatively or additionally, receive circuitry of the NFC communicator may be coupled to only a proportion of the antenna coil to reduce the voltage to which circuitry of the NFC communicator is subjected by a received RF H field.

19 Claims, 6 Drawing Sheets

NFC COMMUNICATORS IMPLEMENTING COIL VOLTAGE REDUCTION CIRCUITRY

PRIORITY CLAIM TO RELATED APPLICATIONS

This application is a national stage application under 35 U.S.C. §371 of PCT/GB2008/000992, filed Mar. 20, 2008, and published as WO 2008/117029A2 on Oct. 2, 2008, which claims priority to United Kingdom Application No. 0705635.1, filed Mar. 23, 2007, which applications and publication are incorporated herein by reference and made a part hereof in their entirety, and the benefit of priority is claimed thereto.

This invention relates to NFC (Near Field Communication) communicators and antenna circuits for NFC communicators.

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimeters (generally to a maximum of 1 meter) are common for near field RF communicators.

Near field RF communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. The term "near field RE communicator" includes not only NFC communicators but also: initiating near field RF communicators such as RFID transceivers or readers (referred to below as RFID readers) that are capable of initiating a near field RF communication but not responding to initiation of a near field RF communication by another near field RF communicator; and responding near field RF communicators such as RFID transponders or tags (referred to below as RFID tags) that are capable of responding to initiation of a near field RF communication by another near field RF communicator but not of initiating a near field RF communication with another near field RF communicator. NFC communicators can act as both RFID transceivers and RFID transponders and are able to communicate with other NFC communicators, RFID transceivers and RFID transponders.

As will be understood from the above, an NFC communicator may operate in an "initiator" mode in which the NFC communicator seeks to initiate near field RF communication or in a "target" mode in which the NFC communicator is receptive to initiation of near field RF communication. NFC communicators may also operate in either a "passive communications mode" or an "active communications mode". When communication is by the "passive communications mode", an initiator NFC communicator will generate an RF field and a target NFC communicator will respond by modulation of the received H field, usually by load modulation. When communication is by the "active communications mode" the initiator NFC communicator and the target NFC communicator each use their own RF H field to enable communication. The terms "passive" and "active" in the context of NFC communicators do not have the same meaning as "passive" and "active" when used in the context of traditional RFID tags and readers where the terms are instead used to define whether the RFID tags and readers have their own power supply or whether a power supply is derived from the received RF HF field.

Examples of near field RF communicators are defined in various standards for example ISO/IEC 18092, ISO/IEC 14443, ISO/IEC 15693 ISO/IEC 21481. Examples of NFC communicators can be found in ISO/IEC 18092 and ISO/IEC 21481 in particular.

Near field RF communicators may be provided as standalone or discrete devices or may be incorporated within or coupled to larger electrical devices or host devices (referred to below as near field RF communications enabled devices) to enable those devices to communicate by the near field with other near field RF communicators or devices incorporating or coupled to such near field RF communicators. When incorporated within a larger device or host, a near field RF communicator may be a discrete entity or may be provided by functionality within the larger device or host. Examples of such larger devices or host devices are, for example, mobile telephones, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players. Other examples of such larger devices or host devices are other electrical or electronic products, for example consumer products such as domestic appliances or personal care products, and other electrical or electronic devices, apparatus or systems. Some areas of application are payment systems, ticketing systems, for example in tickets (for example parking tickets, bus tickets, train tickets or entrance permits or tickets) or in ticket checking systems, toys, games, posters, packaging, advertising material, product inventory checking systems and so on.

RFID readers are generally designed specifically to enable initiation or generation of an RF H field and to detect modulation or affects on that initiated RF H field. The modulation or affects are then demodulated by the circuitry of the RFID reader and the demodulated data interpreted in accordance with the communication protocol under which the RFID reader is operating. This requires that the antenna circuit for such an RFID reader is designed specifically for this purpose. Likewise RFID tags are generally designed specifically to receive an RF H field and to modulate that H field, for example by load modulation or amplitude modulation, and the antenna circuits for such RFID tags are designed specifically for that purpose. The antennas of RFID tags and RFID readers of a specific system will also be designed to be impedance-matched, thus optimizing the inductive coupling range and therefore distance at which the RFID tags and RFID readers can operate and minimizing any null zones or regions within which communication is not possible.

With NFC communicators the position is different. Such NFC communicators need to be capable of both initiating an RF H field and of receiving an RF H field. Moreover a single design of NFC communicator may be used for many different applications and in some of those applications the NFC communicator may function like an RFID tag, in other applications the NFC communicator may function like an RFID reader and in other applications the NFC communicator may sometimes function like an RFID tag and sometimes function like an RFID reader. Also, NFC communicators tend to have small antennas as compared to traditional RFID readers.

In addition an NFC communicator may need to be compatible with existing RFID readers and/or tags. For example when the NFC communicator carries data corresponding to a transport ticket to access a railway station, the NFC communicator will act like an RFID tag, that is it will communicate with RFID readers present in the railway station and will need to interact with such RFID readers in the same way as an RFID tag. That same design or model of NFC communicator may also be used in a similar way to an RFID reader. For example it may be used at a games stadium to check ticket details carried by RFID tags and the NFC communicator will need to be able to interact with those RFID tags as if it was an RFID reader. Hence the antenna design for an NFC communicator needs to be compatible with existing RFID readers and/or RFID tags.

In addition, where the NFC communicator is within a host device, then size limitations of the host and/or the local environment provided by the host may impact on the antenna circuit design and/or constrain the size of the antenna circuit or the antenna coil itself. Such impacts and constraints may seriously detrimentally affect the range over which inductive coupling may be achieved.

The use of existing antenna circuit designs for an NFC communicator thus requires compromise in the operating range or functionality of the NFC communicator. For example an existing antenna circuit might enable inductive coupling up to a range of 10 cm under certain environments, standards or protocols but only up to a range of 1 cm of under other environments, standards or protocols. Also an NFC communicator may be able to operate at a greater range when initiating an RF H field but may have a much reduced range when modulating a received RF H field.

Existing antenna circuit designs can result in large voltage fluctuations across the rest of the NFC communicator during inductive coupling and it can be difficult to protect the circuitry from those voltage fluctuations. In addition existing antenna designs tend to require the use high voltage capacitors, that is capacitors having a voltage rating which exceeds the operating voltage of the relevant circuit. For example if NFC communicator circuitry operates at 3.3 volts, a high voltage capacitor would be a capacitor having a voltage rating above 3.3 volts. Such high voltage capacitors are costly and generally have to be provided as discrete fixed capacitance components which is of itself costly and minimizes flexibility in design.

There is no way of accurately predicting the electromagnetic influences in the environment or environments within which the NFC communicator will operate or how those electromagnetic influences may change with time. Even the effect of a user on the near field communicator may change in dependence upon the metallic and/or magnetic properties of what the user is wearing or carrying or even whether the user's hands are sweaty. Also, during normal operation, an NFC communicator may communicate with a variety of different NFC communicators the antennas of which will almost certainly have different antenna spatial envelopes, different dimensions, shapes, footprints or sizes (form factors).

It will be appreciated from the above, that an NFC communicator may need to be compatible with existing RFID readers and/or tags and may need to cope with many different environments and with potentially unknown or potentially changing H field strengths.

An NFC communicator may be battery powered and the desire to minimise power consumption, for example to prolong battery life, can limit the amount of current available to drive the antenna circuit. Also, as indicated above, size or environmental constraints may affect the antenna circuit design, limiting the size and/or topology of the antenna circuit, particularly the antenna coil. All of these factors will have an effect on the RF H field and therefore the voltage developed across an NFC communicator's antenna circuit during communication to the extent that the components of the NFC communicator need to be designed to operate at or need to be protected from voltages much higher than their intended operating voltages.

An aspect of the present invention provides an NFC communicator that alleviates at least some of the aforementioned problems. An aspect of the invention provides an antenna circuit for an NFC communicator which enables operation of the NFC communicator in both active and passive communication modes.

An aspect of the invention provides an antenna circuit for an NFC communicator where certain capacitors of the antenna circuit are comprised wholly or partly within the silicon circuit of the NFC communicator. Such a design provides increased flexibility and enables optimisation of the antenna circuit.

An aspect of the invention provides an antenna circuit for an NFC communicator comprising low voltage capacitors, thereby reducing the end cost of the antenna circuit and permitting some or all of such low voltage capacitance to be provided by an integrated circuit of the NFC communicator or to be controlled by the integrated circuit.

An aspect of the invention provides an NFC communications enabled device comprising an NFC communicator comprising an antenna circuit which enables operation of the NFC communicator in both active and passive communication modes.

An aspect of the invention provides an antenna circuit operable to both inductively couple with a received RF H field and to transmit an RF H field, the antenna circuit comprising at least one antenna coil and at least one capacitance in antiphase with the antenna coil.

According to an aspect of the present invention, there is provided a near field RF communicator, comprising: an antenna circuit to enable inductive coupling of the near field RF communicator and another near field RF communicator in near field range; a signal supplier coupled to the antenna circuit to supply a drive signal to cause the antenna circuit to generate an RF signal; and a receiver coupled to the antenna circuit to receive a signal inductively coupled to the antenna circuit from another near field RF communicator in near field range, wherein the antenna circuit comprises an antenna element coupled in parallel with a first capacitor, wherein the antenna element comprises an antenna coil in series with a second capacitor to affect a voltage resulting from inductive coupling to the antenna circuit.

An embodiment of such a near field RF communicator enables, by provision of the second capacitor, the voltage developed across an NFC communicator's antenna circuit and thus the voltage experienced by the remainder of the NFC communicator to be limited or reduced below that which would otherwise arise.

According to an aspect of the present invention, there is provided a near field RF communicator, comprising: an antenna circuit to enable inductive coupling of the near field RF communicator and another near field RF communicator in near field range; a signal supplier coupled to the antenna circuit to supply a drive signal to cause the antenna circuit to generate an RF signal; and a receiver coupled to the antenna circuit to receive a signal inductively coupled to the antenna circuit from another near field RF communicator in near field range, wherein the antenna circuit comprises an antenna element coupled in parallel with a capacitor, wherein the antenna element comprises an antenna coil having a tap and the receiver is coupled to the tap.

An embodiment of such a near field RF communicator enables, by tapping off only a part of the voltage developed across antenna for the receiver, the voltage to which the receiver of the NFC communicator is subjected to be limited or reduced below that to which the receiver would otherwise be subjected.

An embodiment provides a near field RF communicator having an antenna circuit to enable inductive coupling, via an RF H field, of the near field RF communicator and another near field RF communicator in near field range. The antenna circuit has an antenna element coupled in parallel with a first capacitor to form a parallel LC circuit. The antenna element has an antenna coil in series with a second capacitor to reduce the voltage to which circuitry of the near field RF communicator is subjected by a received RF H field. Alternatively or additionally, receive circuitry of the near field RF communicator may be coupled to only a proportion of the antenna coil to reduce the voltage to which circuitry of the near field RF communicator is subjected by a received RF H field.

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The NFC communicator may be provided wholly or partially as an integrated circuit or collection(s) of integrated circuits.

Figure 1:
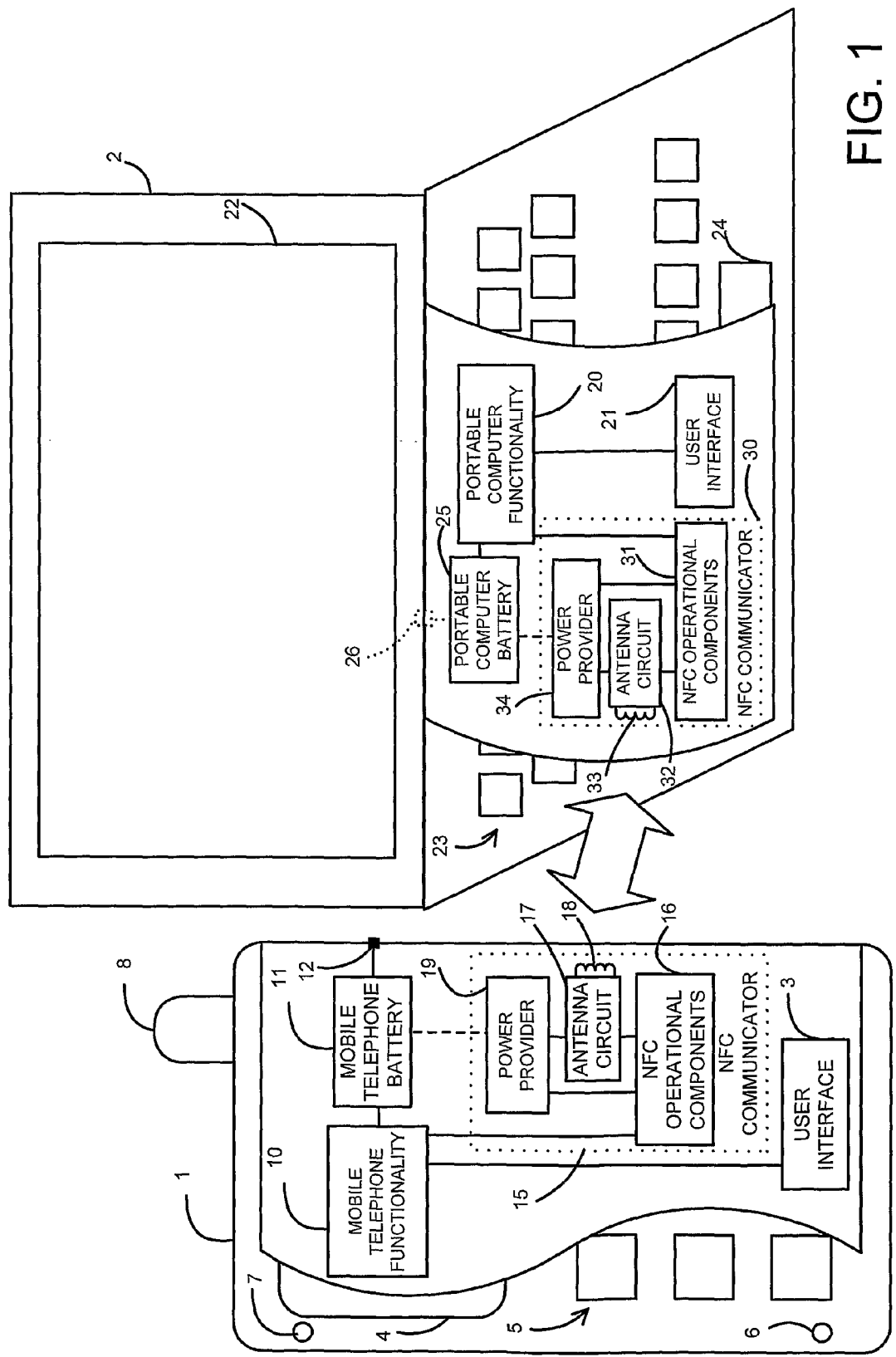
FIG. 1 shows a representational diagram illustrating communication between two NFC communications enabled devices.

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery. Although FIG. 1 shows a standalone mobile telephone (cellphone), the mobile telephone functionality may be incorporated in or associated with a host device such as a computer, for example a notebook, laptop or PDA.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an antenna circuit 17 and 32 comprising an inductor or coil in the form of an antenna 18 and 33. The antenna circuits 17 and 32 enable an alternating magnetic field (RF H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 10 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. As another possibility or additionally as shown by dashed lines in FIG. 1, one or both of the power providers 19 and 34 may simply comprise a coupling to derive power from the corresponding device battery 11 or 25.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

Also, rather than being incorporated within the host device, the NFC communicator 15 or 30 may be associated with the host device, for example by a wired or wireless coupling. In such a case, a housing of the NFC communicator may be physically separate from or may be attached to the housing of the host device; in the later case, the attachment may be permanent once-made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
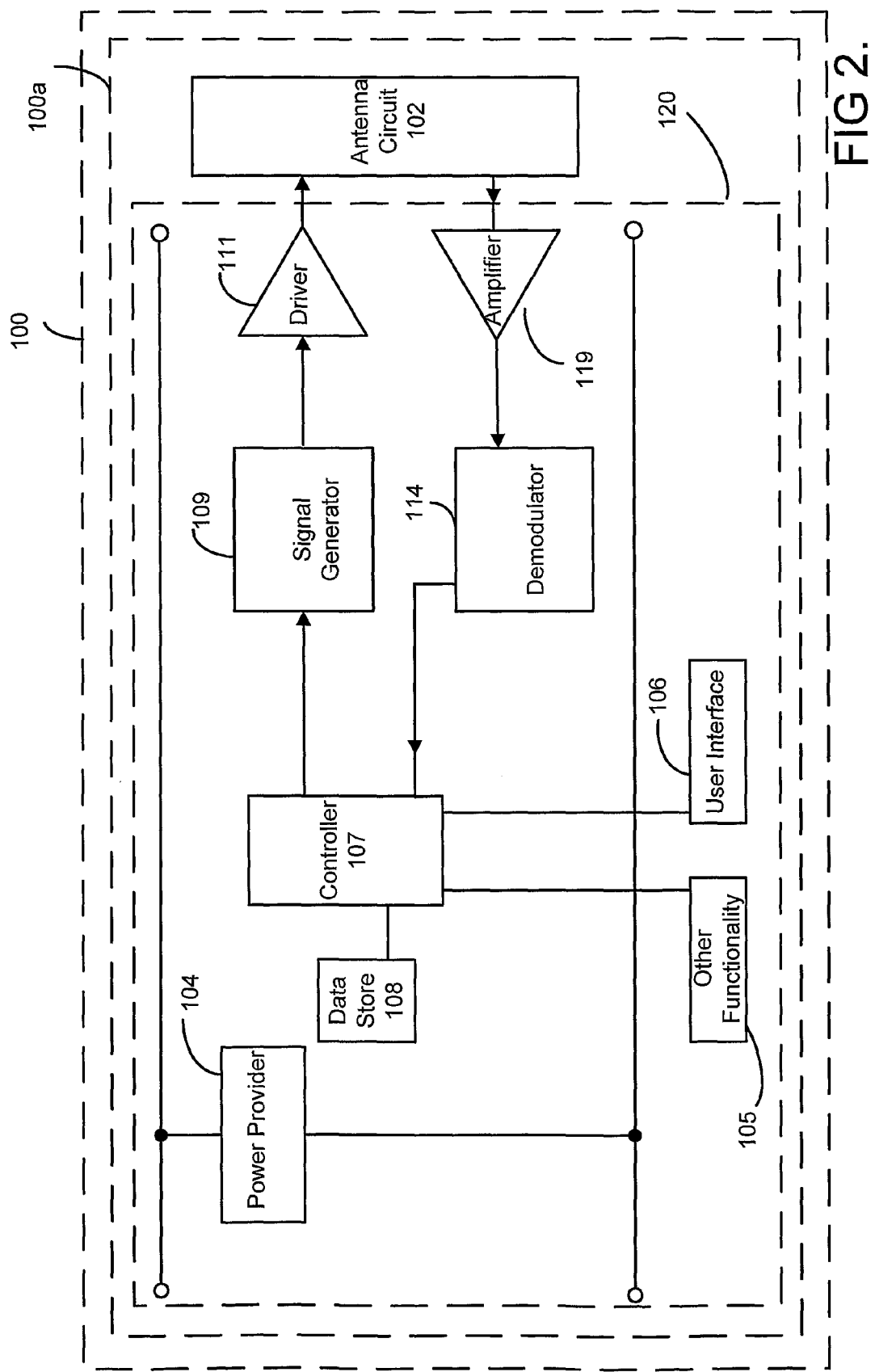
FIG. 2 shows a functional block diagram of an example of an NFC communicator or NFC communications enabled device.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NFC communications enabled device 100 comprises an NFC communicator 100a having NFC operational components including an antenna circuit 102 and NFC functionality 120 comprising power provider 104, controller 107, data store 108, receiver circuitry and transmitter circuitry.

The power provider 104 may be any one or more of the types of power providers discussed above. In the interests of simplicity, power supply couplings from the power provider 104 to other components are not shown in FIG. 2.

The NFC functionality 120 may or may not also have or be capable of being connected or coupled with at least one of other functionality 105 (for example functionality of a host device such as described above) and a user interface 106.

In this example, the receiver circuitry comprises an amplifier 119 coupled to the antenna circuit 102 and a demodulator 114 coupled to the amplifier 119 and the controller 107 for amplifying and demodulating a modulated RF signal inductively coupled to the antenna circuit 102 from another near field RF communicator in near field range and for supplying the thus-extracted data to the controller 107 for processing.

In this example, the transmitter circuitry comprises components for driving the antenna circuit 102 to transmit an RF signal and for modulating an RF signal to enable communication of data between near field RF communicators in near field range. As shown in FIG. 2, the transmitter circuitry comprises a signal generator 109 coupled via a driver 111 to the antenna circuit 102. In this example, the signal generator 110 is configured to cause modulation by gating or switching on and off the RF signal in accordance with the data to be communicated. The NFC communicator may use any appropriate modulation scheme that is in accordance with the standards and/or protocols under which the NFC communicator operates. Alternatively a separate or further signal controller may be incorporated within the NFC operational components of functionality 120 to control modulation of the signal generated by the signal generator 109 in accordance with data or instructions received from the controller 107.

The controller 107 of the NFC functionality 120 is provided to control overall operation of the NFC communicator. The controller 107 is coupled to the data store 108 which is provided to store data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store.

The NFC communicator 100a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. NFC communicators commonly operate at or around 13.56 MHz.

When in initiator or target mode, the NFC communicator may communicate in accordance with an active or passive protocol. When using an active protocol, the initiating NFC communicator will transmit an RF field and following completion of its data communication will turn off its RF field. The responding near field RF communicator (target) will then transmit its own RF field and data and then turn off its RF field and so on. When using a passive protocol the NFC communicator (initiator) will transmit and maintain its RF field throughout the entire communication sequence and the target will modulate that RF field with the data to be communicated. The protocol used will depend on instructions received from the controller 107 and the response received from a responding near field RF communicator.

In FIG. 2 control of the operation of the NFC communicator is through controller 107. As another possibility, where the NFC communicator is part of or associated with a host device, control of the operation of the NFC communicator may at least partly be directed by the host device, for example through the other functionality 105. In such circumstances all or part of the control may be provided by the other functionality 105 which may be part of the NFC functionality or a host. For example the NFC communicator controller 107 may control modulation and modulation protocols whereas the data to be transmitted may be provided by the other functionality 105.

An NFC communicator thus has the capability to transmit an RF H field, to receive an RF H field, to modulate a transmitted RF H field and also to modulate a received RF H field.

Figure 3:
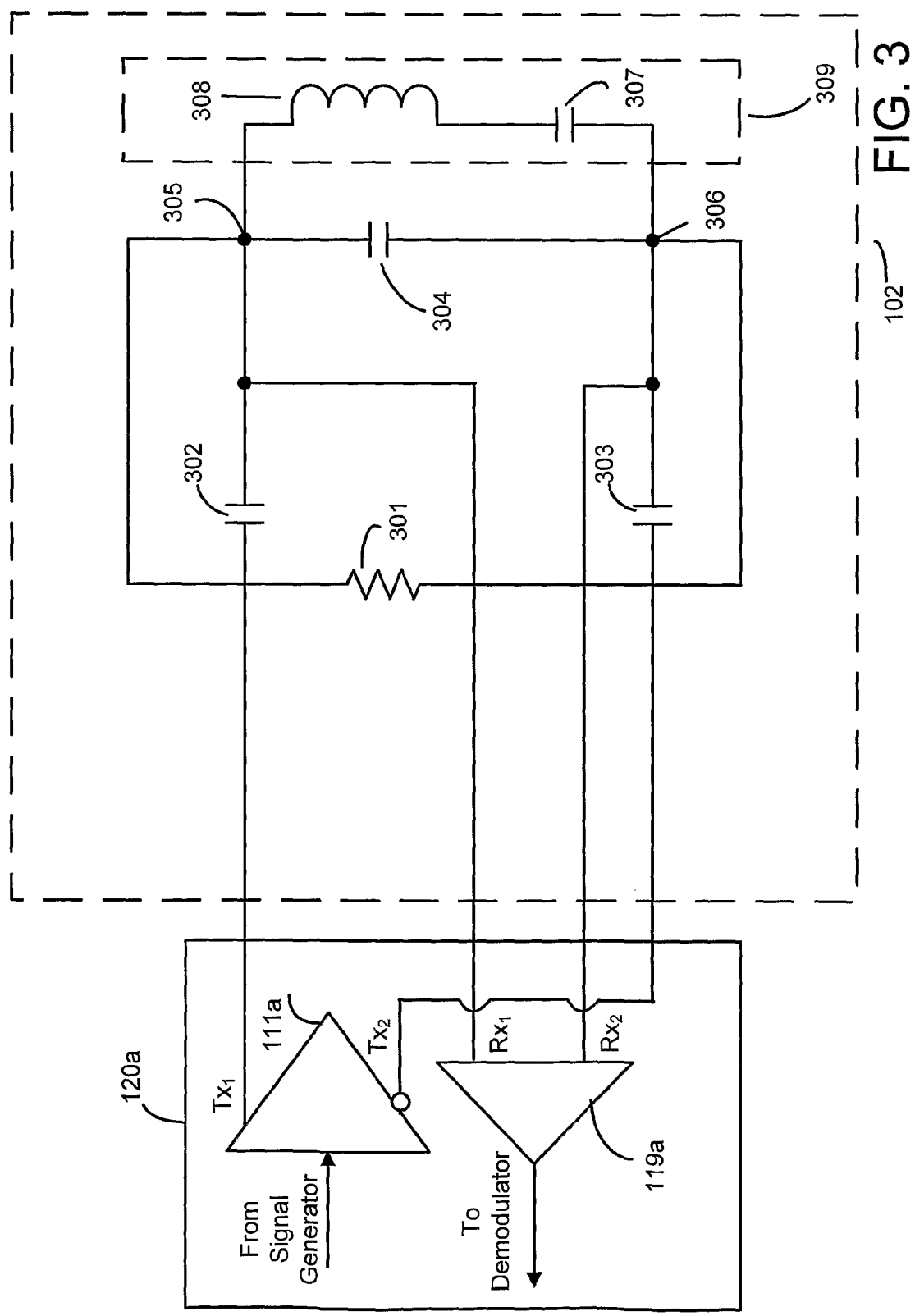
FIG. 3 shows a functional circuit diagram of an NFC communicator to illustrate one example of an antenna circuit embodying the present invention.

FIG. 3 shows a functional circuit diagram of an NFC communicator embodying the invention to illustrate one example of an antenna circuit 102. In the interests of simplicity in FIG. 3, only some of the NFC functionality 120a is shown in FIG. 3.

As shown in FIG. 3, antenna circuit 102 comprises an antenna element 309 coupled in parallel with a first capacitor 304 to form a tank circuit (a parallel LC resonant circuit).

The antenna element 309 comprises an antenna coil element 308 in series with a second capacitor 307 which second capacitor 307 is anti-phase to the antenna coil element 308 and affects a voltage resulting from inductive coupling of an RF H field to the antenna circuit. As shown the antenna coil element 308 comprises a single antenna coil which may comprise one, two or more coils or loops.

The junction 305 between capacitor 304 and antenna element 309 is coupled to one input Rx1 of a differential amplifier 119a forming the amplifier 119 shown in FIG. 2 while the junction 306 between capacitor 304 and antenna element 309 is coupled to the other input Rx2 of the differential amplifier 119a. To enable the antenna circuit to be driven, respective outputs Tx1 and Tx2 of driver 111a are coupled to the junctions 305 and 306 via respective further capacitors 302 and 303. Thus, in this example, the antenna circuit 102 has double-ended or differential coupling (Rx1 and Rx2) to the receive circuitry and double-ended or differential coupling (Tx1 and Tx2) to the transmit circuitry of the NEC functionality 120a.

A resistor 301 is coupled in parallel with capacitor 304 between junctions 305 and 306.

The value of the capacitor 307 is chosen to "back-off" or reduce an induced voltage below that which might potentially have been induced by a received RF H field in the absence of the capacitor 307 while the resistor 301 acts as a shunt, limiting the voltage that can potentially be generated across the antenna circuit 102, and so protecting the NFC functionality from the potentially higher voltages that may otherwise occur across the antenna coil element 309. This enables the receiver circuitry to be connected directly to the antenna coil element 309. This enables protection of the receiver circuitry against received RF H fields whose strength is not only not known in advance but may because, for example, of the different nature of the near field RF communicator with which the NFC communicator is communicating, significantly exceed that of the NFC communicator's own transmitted RF H field, for example the other near field RF communicator may be designed to operate over a much larger range than the NFC communicator and/or any geometrical mismatch between the two antennas may expose one to a greater RF H field than antenna size/shape would otherwise dictate. The provision of capacitor 307 thus provides protection without reducing the antenna circuit's own RF H field strength.

As described there is a single capacitor 307. As another possibility; the capacitor 307 may be a split capacitor. For example, the capacitance (with its value doubled) may be split into two capacitors one either side of the antenna coil 308 to enable generation of a symmetrical RF H field.

As one possibility, the size of capacitor 307 to be employed to back off antenna coil 308 to effect a reduction in the apparent inductance of antenna coil 308 (that is the total inductance of antenna element 309) may be calculated using the following formula:

$$C_{307} = \frac{1}{(2\pi \times Fc)^2 Lneg}$$

where Fc is the carrier frequency (for example 13.56 MHz) and Lneg is the amount (in Henrys) that inductance 308 is to be reduced by.

Generally, the NFC functionality 120a will be formed as one or more integrated circuits (generally monocrystalline silicon integrated circuits) mounted on a Printed Circuit Board(s) (PCB(s)) or the like and the antenna circuit will be formed by external discrete components formed on or carried by (e.g. surface mounted on) a PCB, for example the antenna coil element may be defined by conductive tracks on a PCB while any capacitors and resistors of the antenna circuit may be provided by discrete components mounted to the PCB.

The capacitors 302, 303 and 304 may have a low voltage rating or ratings because the presence of capacitor 307 and resistor 301 reduces the maximum voltage to which they may potentially be subjected in operation. This should reduce costs because lower voltage rating capacitors may generally be cheaper components than higher voltage rating capacitors. In addition, if, for example, the capacitors 302, 303 and 304 have a voltage rating the same as or below the operating voltage of the NFC functionality 120 then these capacitors may be partially or wholly integrated, for example these capacitors may be defined using parts of one or more metallisation layers of the integrated circuit, rather than being present as components external to the NFC functionality 120a. Forming these capacitors partially or wholly on-chip has the added advantage of increasing flexibility in antenna circuit design because it should be possible to modify or adjust the design and value of those capacitors during the integrated circuit design phase. It may also be possible to form these capacitors so that their capacitance can be trimmed or optimised after manufacture of the integrated circuit or even so that their value(s) may be changed under the control of the NFC communicator controller 107 or other control functionality within or associated with the NFC communicator, for example the use of switched capacitor networks or other variable capacitance elements or MEMs (Micro Electro Mechanical devices) may be possible Although the resistor 301 is generally an external component, it may be possible to integrate it. Generally capacitor 307 will have a voltage rating higher than that of the NFC integrated circuit and will therefore not be integrated. It may be possible for resistor 301 to be switchable to provide the load modulation.

In operation of the NFC communicator shown by FIG. 3, when the NFC communicator is acting as a target and is in passive target communication mode, then the NFC communicator will communicate any response to an initiator near field RF communicator in near field range by modulating the RF H field received from that near field RF communicator under the control of the controller 107. The NFC communicator may in these circumstances use load modulation, that is an impedance (not shown) of the NFC functionality may be switched in and out under the control of the controller 107 in accordance with the data to be communicated so as to change the effective impedance of the antenna 'tank' (that is the parallel LC resonant circuit defined by the antenna coil element (antenna coil 308 in series with capacitor 307) and capacitor 304) in accordance with the data to be communicated, thereby modulating the load on the antenna circuit of the initiating near field RF communicator and thus modulating, in this example, the amplitude and phase of the signal provided by the antenna circuit of the initiator to its receiver circuitry.

When the NFC communicator antenna circuit 102 is within an RF H field (for example when the NFC communicator is in passive communication mode and within range of a second device transmitting an RF H field as discussed above or when the NFC communicator is in active communication mode with its RF H field switched off and within the RF H field generated by a target), the inherent inductive impedance of the coil 308 results in the current induced in the antenna coil 308 generating a voltage across the coil while the capacitive impedance of the capacitor 307 results in the current induced in the antenna coil 308 generating a voltage that is in antiphase to that generated across the coil 308. The voltage seen by the rest of the antenna circuit and, as a result, the NFC communicator functionality 120a is a combination of the voltage generated across the antenna coil 308 and the antiphase voltage generated across the capacitor 307. Accordingly, the presence of the capacitor 307 controls the voltage to which the rest of the antenna circuit (and as a result the NFC communicator functionality 120a) is subjected. In particular, the capacitor 307 acts to reduce the voltage to which the rest of the antenna circuit and the NFC functionality are subject below the voltage to which they would have been subject in response to inductive coupling with the same strength RF H field in the absence of the capacitor 307.

The presence of capacitor 307 thus reduces the potential difference (voltage) developed between junctions 306 and 305 for a given received H field, thereby reducing the voltage between receiver couplings Rx1 and Rx2 and between transmission couplings Tx1 and Tx2, so reducing the maximum potential voltage to which the receiver and transmitter circuitry may be subjected. Although antenna circuit designers generally aim to maximise the voltage induced by any given H field, the use of capacitor 307 enables control of the voltage that the capacitors 302, 303 and 304 and the NFC functionality 120a (for example the driver 111a and amplifier 119a) need to be able to withstand, thereby enabling the use of capacitors 302, 303 and 304 with lower voltage ratings and enabling coupling of the antenna circuit 102 directly to the NFC functionality 120a.

When the NFC communicator is in the active communication mode, the controller 107 (FIG. 2) will cause the signal generator 109 (FIG. 2) and driver 111a to drive the antenna circuit 102 to initiate or generate an RF-H field. The antenna circuit 102 is tuned to the required RF transmission frequency which, for an NFC communicator operating in accordance with ISO 18092, is 13.56 MHz (Megahertz). The capacitors 302 and 303 add capacitance to bring the tuning closer to the required frequency.

The drive signal from the driver 111a is coupled to the antenna coil 308 via capacitors 302 and 303. The driver 111a thus develops an RF voltage across transmission connections Tx1 and Tx2 which causes an RF current to flow between transmission connections Tx1 and Tx2 through antenna circuit 102. As this RF current flows between points 306 and 305, it divides between resistor 301, capacitor 304 and antenna element 309 in accordance with their relative impedances. The portion of the RF current that flows through antenna element 309 passes through antenna coil 308 producing an RF H field.

For any given RF voltage supplied by driver 111, the RF current that flows through antenna circuit 102 is inversely proportional to the total impedance of antenna circuit 102. Capacitors 302 and 303 act to transform the impedance of the tank circuit to reduce the total impedance of antenna circuit 102 and thus multiply the RF current produced for any given RF voltage. For example, if the impedance of the tank circuit is Xtank=A+Bj, and the impedance of each capacitor 302, 303 is Xc=−Cj, then the total impedance of antenna circuit 102 will be Xtotal=A+(B−2C)j. Accordingly, capacitors 302 and 303 reduce the total impedance of antenna circuit 102 thereby multiplying the current going to the tank circuit to top up the resonant current flowing through the antenna coil 308 and consequently the strength of the induced RF H field.

Although not shown in FIG. 3, the resistor 301 may be coupled in series with a switch controlled by the controller 107 to enable the resistor to be switched out of the circuit whilst the NFC communicator is transmitting an RF H field, so as not to limit the RF current available to the antenna coil during transmission. The antenna-coil 308 and capacitances 304 and 307 act in a similar way as for passive communication (or receiving mode) and can also act as a current reservoir. Capacitance 304 forms a parallel resonant tank circuit with capacitor 307 and antenna coil 308 and thus may enable the amount of current seen at antenna coil 308 to be increased when device is generating an RF H field. The capacitors 302 and 303 change the high impedance of the tank circuit (which looks inductive) to allow efficient "top up" of the resonant current to compensate for losses due to resistance and/or other coils in the proximity.

Any appropriate form of modulation may be used to enable data communication, for example modulation of the RF H field may be achieved through gating or switching of the generated signal in accordance with the relevant communication protocols. The form of modulation will depend on the type of drive functionality incorporated within the NFC communicator. For example, a current drive will control the current supplied to the antenna circuit 102 and may achieve modulation by changing the current. A voltage drive on the other hand will control the voltage supplied to the antenna circuit 102 and may achieve modulation by controlling pulses supplied the antenna circuit 102. Any suitable type of modulation technique may be used (e.g. amplitude and/or phase modulation) and any suitable modulation encoding scheme may be used The antenna circuit 102 of FIG. 3 has a double-ended, balanced or differential transmission input, that is the drive signal supplied to the antenna circuit 102 is the difference between the signals at transmission couplings Tx1 and Tx2. Likewise, the receiver output of the antenna circuit is double-ended or differential, that is the received signal is the difference between the signals at receiver couplings Rx1 and Rx2.

Figure 4:
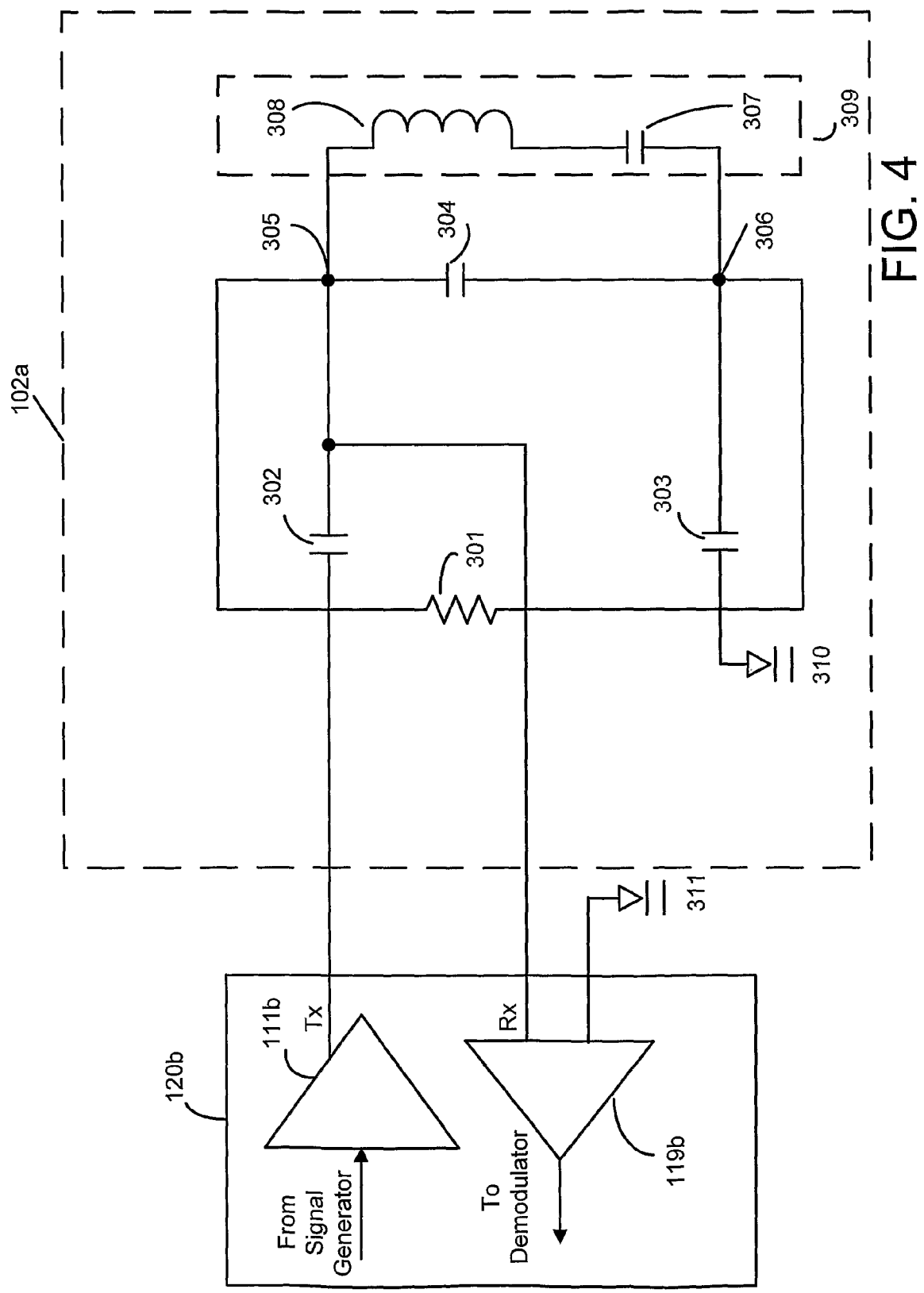
FIG. 4 shows a functional circuit diagram of an NFC communicator to illustrate another example of an antenna circuit embodying the present invention.

FIG. 4 shows a functional circuit diagram of an NFC communicator having an antenna circuit 102a that differs from that shown in FIG. 3 in that the antenna circuit has a single transmission input coupling Tx coupled to a single output driver 111b and a single receiver output coupling Rx coupled to a single input amplifier 119b so that the transmission signal is defined between transmission connection Tx and a signal ground coupling 311 and the receiver signal is defined between Rx and a coupling to ground 310 via capacitor 303. Both grounds (earths) may be provided by a local ground of the NFC communicator or a host.

The above described embodiments enable protection of the receiver circuitry against received RF H fields whose strength is not only not known in advance but may because, for example, of the different nature of the near field RF communicator with which the NFC communicator is communicating, significantly exceed that of the NFC communicator's own transmitted RF H field, for example the other near field RF communicator may be designed to operate over a much larger range than the NFC communicator and/or any geometrical mismatch between the two antennas may expose one to a greater RF H field than antenna size/shape would otherwise dictate.

Figure 5:
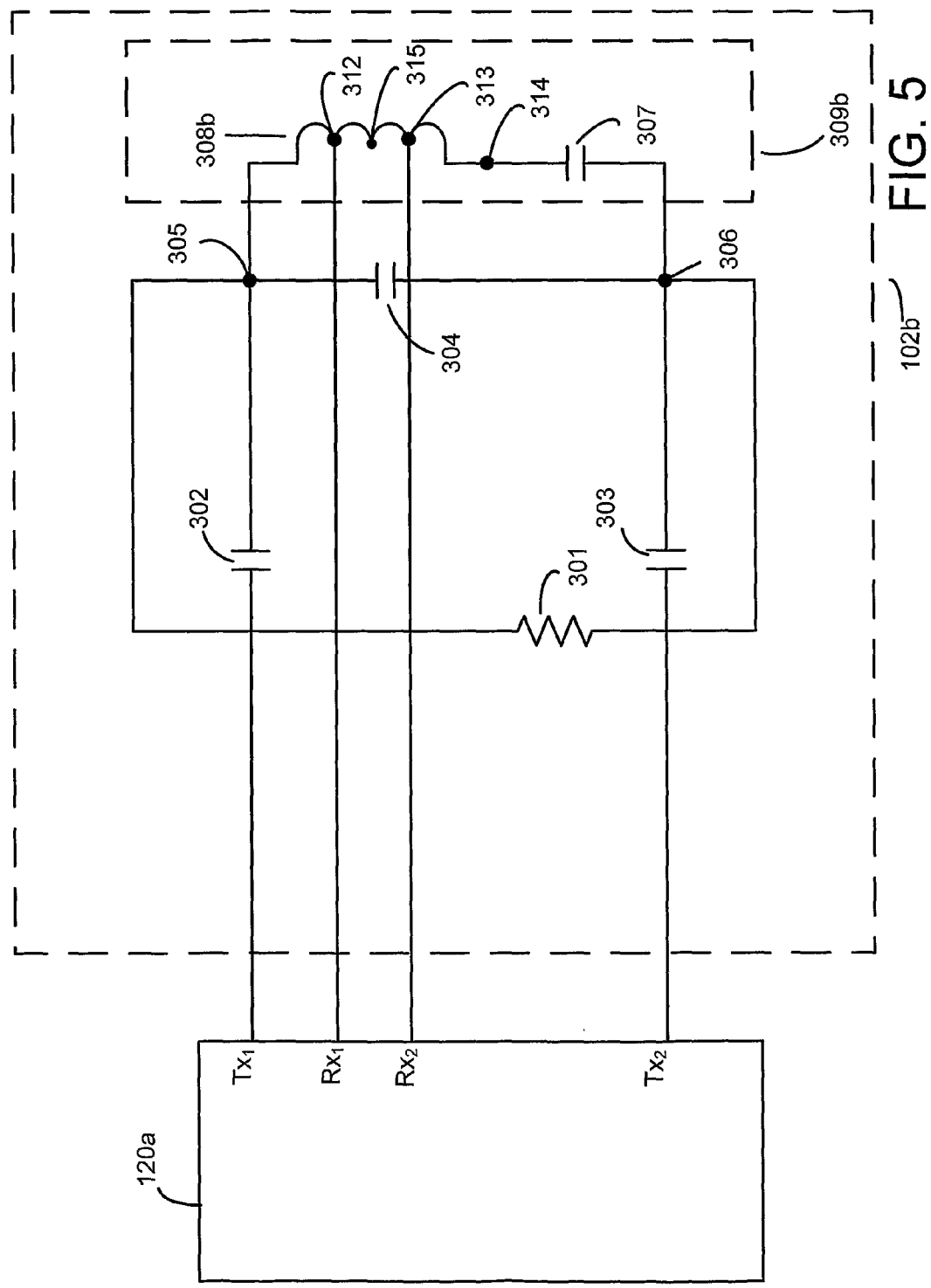
FIG. 5 shows a functional circuit diagram of an NFC communicator to illustrate another example of an antenna circuit embodying the present invention.

FIG. 5 shows a functional circuit diagram of an NFC communicator to illustrate another example of an antenna circuit 102 embodying the present invention.

The embodiment shown in FIG. 5 differs from that shown in FIG. 3 in that the receiver input couplings Rx1 and Rx2 are coupled across only a part of the antenna coil 308*b*, that is receiver input couplings Rx1 and Rx2 are coupled to taps 312 and 313 so that the antenna coil 308*b* forms an autotransformer and the voltage across the receiver input couplings Rx1 and Rx2 is stepped down from that across the entire antenna coil 308*b* (i.e. from that between junctions 305 and 306) so that the voltage to which the receiver circuitry is subjected when an RF H field is coupled to or received by the antenna coil is less than the voltage to which the transmitter circuitry is subjected thereby reducing even further the maximum voltage that amplifier 119 needs to be able to withstand. This is advantageous because it enables the NFC communicator to protect the receiver circuitry against received RF H fields without reducing the strength of the NFC communicator's own RF H field. The transmitter circuitry should be isolated or otherwise protected during reception in this example.

Preferably, taps 312 and 313 are located equidistant from a centre point 315 of antenna coil 308*b* so as to enable common mode rejection to suppress voltage/current noise common to the two RX couplings. The capacitance 307 (with its value doubled) could also be split to provide respective capacitors on either side of the antenna coil as mentioned above.

Figure 6:
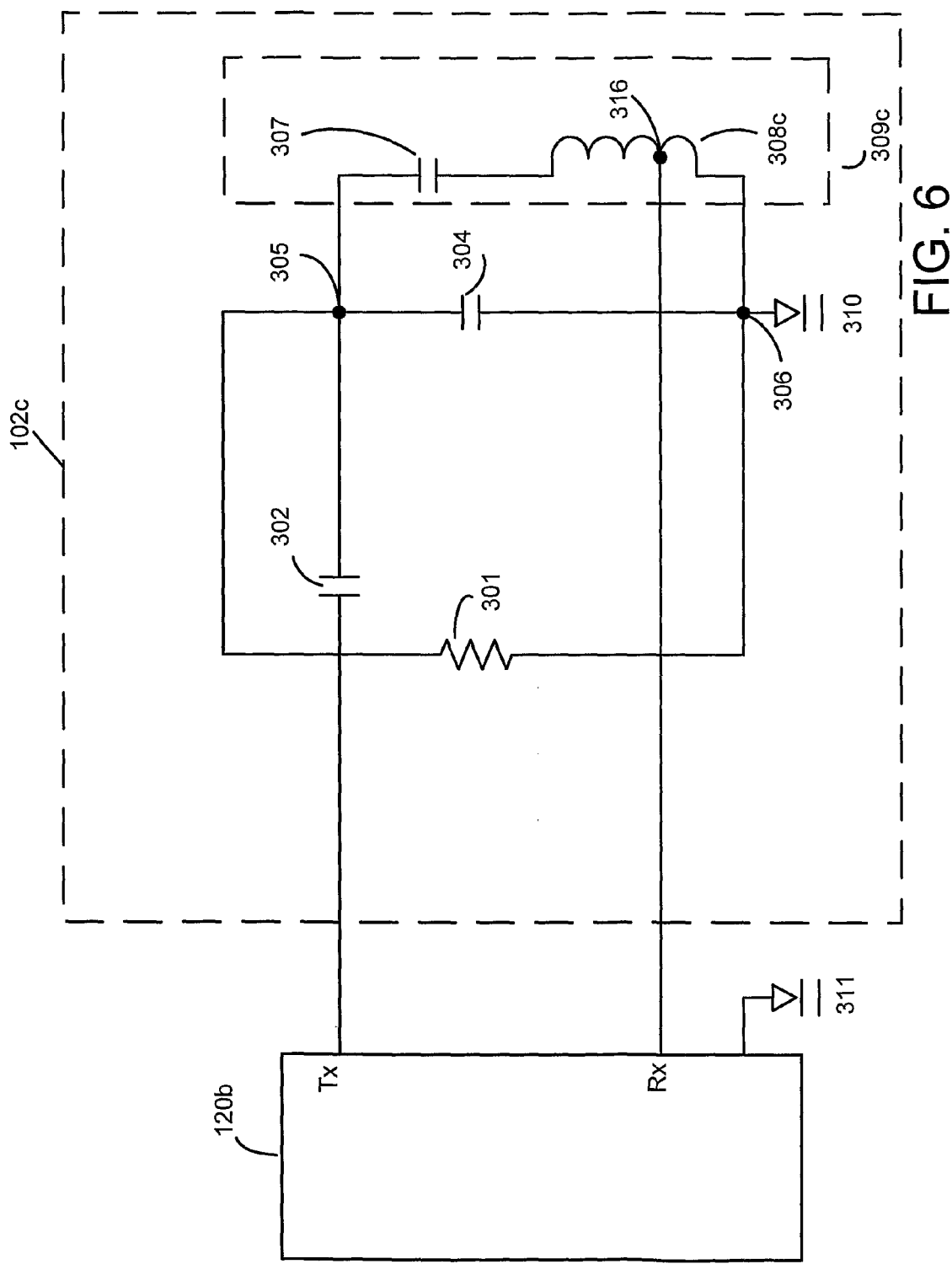
FIG. 6 shows a functional circuit diagram of an NFC communicator to illustrate another example of an antenna circuit embodying the present invention.

FIG. 6 shows a functional circuit diagram of an NFC communicator having an antenna circuit 102*c* that differs from that shown in FIG. 5 in that, like the antenna circuit shown in FIG. 4, the antenna circuit 102*c* has a single transmission input coupling Tx coupled to a single output driver (not shown in FIG. 6) and a single receiver output coupling Rx coupled to a single input amplifier (not shown in FIG. 6) so that the transmission signal is defined between transmission connection Tx and a ground coupling 311 and the receiver signal is defined between Rx and a coupling to ground 310.

As a consequence of being single-ended, the antenna circuit 102*c* also differs from that shown in FIG. 5 in that it has only a single tap 316 to which reception connector Rx is coupled. In addition, as shown, the positions of capacitor 307 and antenna coil 308*c* in antenna element 309*c* are transposed (when compared to the embodiments of FIGS. 3, 4 and 5) to further reduce the voltage to which the receiver coupling RX is subjected by as a result of a received RF H field. Capacitor 303 of FIGS. 3, 4 and 5 is also not present in this embodiment.

When the antenna circuit 102*a* shown in FIG. 6 receives an RF H field, the antenna circuit 102*c* will function in a manner similar to the antenna circuit 102*b* of FIG. 5. However, the transposition of capacitor 307 and antenna coil 308*c* will bring the voltage at tap 316 closer to ground, thereby reducing the voltage to which receiver coupling Rx is subjected. The absence in this embodiment of capacitor 303, means that point 306 is closer to ground, so further reducing the voltage seen by Rx. Preferably, tap 316 is as close as possible (whilst still enabling sufficient signal) to the end of antenna coil 308*c* that is coupled to point 306, thus reducing the fraction of the potential difference developed across antenna coil 308*c* that is seen by Rx. Reduction of the voltage seen by reception connection Rx advantageously reduces the maximum voltage that amplifier 119 needs to be able to withstand. It will of course be appreciated that the value of capacitor 302 should be adjusted to compensate for the removal of capacitor 303.

In the embodiments of FIGS. 5 and 6, capacitor 307 serves, as in the embodiments of FIGS. 3 and 4, to reduce the potential difference developed across capacitor 304 and to protect the transmission connections from over-voltage. Omitting the capacitor 307 would enable greater coil current to flow for a given transmission voltage but would require the transmission circuitry input Tx to be protected against or designed to tolerate higher voltages.

In the embodiments described above, the antenna coil element comprises a single antenna coil which may comprise one, two or more coils or loops. As another possibility, the antenna coil element may comprise two or more antenna coils. It may also be possible to use a conventional step down transformer rather than an autotransformer.

When any of the NFC communicators described above is transmitting an RF H field, then resistor 301 may be disconnected to increase the current to the antenna coil for RF H field production. A person skilled in the art will appreciate that this may be achieved in a number of ways, for example the resistor 301 may be coupled in series with a switch (for example a transistor e.g. a MOSFET) controlled by the controller 107 to enable the resistor to be switched out of the circuit whilst the NFC communicator is transmitting an H field.

Providing an NFC communicator with an antenna circuit as described above avoids the performance of the NFC communicator being restricted by the physical size and shape of the coil antenna. Readers/initiators, for example, are generally larger than and have fewer coils than tags/targets. Capacitor 307 advantageously reduces the affects of the physical size and shape of the antenna coil on the performance of the antenna circuit. Thus, capacitor 307 may be described as a "negative inductance" which reduces the apparent inductive value of the antenna coil. This allows the apparent inductive value of the antenna coil to be divorced from its physical form thereby enabling greater ranges of antenna coil sizes and configurations to be employed.

Small NFC communicators, for example tag sized devices, can be poor initiators due to physical size constraints on their antenna coils. This may be ameliorated by increasing the number of antenna coil turns to increase the generated field strength. However, an increased number of antenna coil turns results in both the antenna coil having an increased inductance, and an increase in the voltage induced across the coil for a given amount of current. If this increase in voltage is too great it may exceed the operating voltage of other components of the NFC communicator thereby causing failure or reduced performance. Advantageously, by reducing the apparent inductive value of the antenna coil, capacitor 307 removes a proportion of the antenna coil voltage seen by other components of the NFC communicator thereby enabling their continued operation.

For a given supply voltage, reducing the apparent inductive value of the antenna coil advantageously facilitates the supply of current to the antenna coil. Furthermore, it allows lower voltage rated components to be used, and allows a shunt circuit (used in target mode and represented by resistor 301 above) to be connected across the combined inductance of the antenna coil plus the "negative inductance" of the capacitor 307.

Although induction of a high voltage is generally desirable when receiving a low strength field, the NFC functionality coupled to the antenna circuit needs to be protected from over-voltage resulting from received high strength fields when the NFC communicator is in target mode. Providing a shunt circuit across the tank circuit advantageously protects the NFC functionality from high induced voltages. Although shown as a fixed resistor 301, the shunt circuit may comprise voltage regulating circuitry providing, for example, a variable resistance and the voltage that it regulates may be lowered by reducing the shunt resistance so as to divert more current through the shunt. As another possibility, the resistance may be adjusted or modified during the design or production.

Capacitor 307 advantageously enables connection of low voltage rated circuitry (such as integrated circuits) across a tank circuit and thus avoids having to both recover and control received voltages (as generated by an incoming RF H field) at the TX1 and TX2 inputs.

Preferably capacitors 302 and 303 are dimensioned or have values that allow as efficient as possible a current supply to the tank circuit to enable efficient generation of the required field strength when in initiator mode. This means that the antenna circuit with the TX1 and TX2 points connected to a low impedance such as the driver 111 is tuned to the carrier frequency.

Thus, when the shunt circuit starts lowering the impedance between TX1 and TX2, to reduce the voltage it sees, the voltage generated across the tank circuit increases as the whole antenna circuit is brought closer to the carrier frequency, requiring handling of very high shunt currents. Providing the capacitor 307 enables better regulation of the induced voltage by enabling connection of the shunt resistor 301 across antenna element 309 which does not bring the network tuning all the way to the carrier frequency.

Where this application refers to capacitors, this should be taken to encompass any suitable component having capacitance. Likewise where the text refers to an antenna, or an antenna coil, this should be taken to mean any inductive component suitable for use in coupling to an RF H field. Also, where this application refers to a resistor, this should be taken to encompass any suitable component having resistance.

The differential circuits of FIGS. 3 and 5 advantageously enable twice the signal strength for the same received voltage as compared to the single ended circuits of FIGS. 4 and 6. Differential circuits can also provide greater immunity to noise through common mode rejection.

It will be apparent to the skilled person that although FIGS. 3 and 5 show fully differential circuits and FIGS. 4 and 6 fully single-ended circuits, combinations may be possible. For example an antenna circuit embodying the invention may have two receiver couplings Rx1 and Rx2 to couple to differential receiver circuitry and a single transmitter coupling Tx to couple to single output transmitter circuitry or an antenna circuit embodying the invention may have two transmitter couplings Tx1 and Tx2 to couple to differential transmitter circuitry and a single receiver coupling Rx to couple to single input receiver circuitry.

Further components may be added to the antenna circuits described above. For example, additional resistors may be added to any part of antenna circuit 102 or 102a to reduce the Q factor of the circuit and as a result increase the bandwidth of circuit operation. Also, filter circuitry or components may be provided to comply with electromagnetic radiation emission regulations.

NFC communicators are described above. The present invention may however be applied to any other form of near field RF communicator that is capable of both initiating and responding to initiation of an RF H field or of transmitting and receiving an RF H field, for example an RFID reader or tag operating under an active protocol.

As used herein RF means any suitable frequency under which near field RF communicators may operate, for example 13.56 MHz for NFC communicators.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A near field communications (NFC) device, comprising:
    an antenna circuit configured to enable inductive coupling, via a magnetic field, of the NFC device and another NFC device in near field range;
    a signal supplier, coupled to the antenna circuit, configured to supply a drive signal to cause the antenna circuit to generate a radio frequency (RF) signal; and
    a receiver, coupled to the antenna circuit, configured to receive a second RF signal inductively coupled, via the magnetic field, to the antenna circuit from the other NFC device in the near field range,
    wherein the antenna circuit comprises:
        an antenna element coupled in parallel with a capacitor, wherein the antenna element comprises:
            an antenna coil having a tap and a second capacitor coupled in series with the antenna coil, and
    wherein the receiver is coupled to the tap.

2. The NFC device of claim 1, further comprising:
    a capacitor arrangement comprising at least one of:
        a third capacitor coupled between the antenna element and the signal supplier;
        a plurality of fourth capacitors coupling opposite ends of the antenna element to the signal supplier;
        a fifth capacitor coupling the antenna element to a ground; and
        a plurality of sixth capacitors coupled to opposite ends of the antenna element, one of the plurality of sixth capacitors coupling the antenna element to the signal supplier and another one of the plurality of sixth capacitors coupling the antenna element to the ground.

3. The NFC device of claim 1, further comprising:
    a resistor coupled in parallel with the antenna element.

4. The NFC device of claim 1, wherein a first end of the antenna coil is coupled to a ground and a second end of the antenna coil is coupled to the second capacitor.

5. The NFC device of claim 4, wherein the tap is closer to the first end than to the second end.

6. The NFC device of claim 1, further comprising:
    a third capacitor coupling the antenna element to the signal supplier.

7. The NFC device of claim 1, further comprising:
    a plurality of third capacitors coupling opposite ends of the antenna element to the signal supplier.

8. The NFC device of claim 1, wherein a first end of the antenna element is coupled to the signal supplier via a third capacitor and a second end of the antenna element is coupled to a ground.

9. The NFC device of claim 1, wherein the antenna coil comprises:
    a plurality of taps, the tap being from among the plurality of taps, the plurality of taps being coupled to respective inputs of the receiver.

10. The NFC device of claim 9, wherein the plurality of taps is substantially symmetrically disposed about a center point of the antenna coil.

11. The NFC device of claim 1, wherein the receiver has first and second inputs,
wherein the tap is coupled to the first input, and
wherein the second input is coupled to a ground.

12. The NFC device of claim 1, further comprising:
a resistor coupled in parallel with the antenna element.

13. The NFC device of claim 1, wherein the NFC device is configured to communicate the RF signal in accordance with ISO/IEC 18092, ISO/IEC 21481, ISO/IEC 14443 or ISO/IEC 15693.

14. A near field communication (NFC) device, comprising
an antenna element coupled in parallel with a first capacitor, the antenna element including:
an antenna coil coupled in series with a second capacitor to affect a voltage resulting from inductive coupling to the antenna coil, the antenna coil a tap to enable tapping off only as of the voltage resulting from the inductive coupling; and
a receiver, coupled to the tap, the receiver configured to receive a radio frequency (RF) signal inductively coupled, via the magnetic field, to the antenna element from another NFC device.

15. The NFC device of claim 14, wherein the antenna element is further coupled in parallel with a third capacitor, and
wherein the antenna coil is further coupled in series with a fourth capacitor to affect the voltage.

16. A near field communications (NFC) enabled device, comprising:
a host device; and
a NFC device, coupled to the host device, the NFC device including:
an antenna circuit configured to enable inductive coupling, via a magnetic field, of the NFC enabled device and another NFC device in near field range, the antenna circuit including:
an antenna coil having a tap,
a first capacitor coupled in series with the antenna coil;
a second capacitor coupled in series with the antenna coil; and
a receiver, coupled to the tap, the receiver configured to receive a radio frequency (RF) signal inductively coupled, via the magnetic field, to the antenna circuit from the other NFC device.

17. The NFC enabled device of claim 16, wherein the host device includes at least one of:
a mobile telephone;
a portable computing device;
a personal or a desk top computer;
a computer peripheral; or
a portable audio or video player.

18. The NFC enabled device of claim 16, wherein the host device is configured to communicate data or control commands to the NFC device.

19. The NFC enabled device of claim 16, wherein the NFC device is configured to be implemented as a card, the card being configured to be received in an appropriate slot of the host device.

* * * * *

UNITED STATES PATENT AND TRADEMARK OFFICE
CERTIFICATE OF CORRECTION

PATENT NO.        : 8,489,020 B2
APPLICATION NO.   : 12/532737
DATED             : July 16, 2013
INVENTOR(S)       : Joakim Bangs et al.

Page 1 of 1

It is certified that error appears in the above-identified patent and that said Letters Patent is hereby corrected as shown below:

In the Claims:

Column 17, Line 11, please replace "comprising" with --comprising:--;

Column 17, Line 16, please replace "coil a tap" with --coil having a tap--; and

Column 17, Line 17, please replace "only as of the" with --only a part of the--.

Signed and Sealed this
Sixth Day of May, 2014

Michelle K. Lee
*Deputy Director of the United States Patent and Trademark Office*